United States Patent
Arlabán Gabeiras et al.

(10) Patent No.: US 10,148,154 B2
(45) Date of Patent: Dec. 4, 2018

(54) ROTARY ELECTRIC GENERATOR STATOR, ROTARY ELECTRIC GENERATOR COMPRISING SAID STATOR AND WIND TURBINE INCORPORATING SAID ROTARY ELECTRIC GENERATOR

(71) Applicant: ACCIONA WINDPOWER, S.A., Navarra (ES)

(72) Inventors: Teresa Arlabán Gabeiras, Navarra (ES); José Miguel García Sayés, Navarra (ES); Miguel Núñez Polo, Navarra (ES)

(73) Assignee: ACCIONA WINDPOWER, S.A., Sevilla (ES)

( * ) Notice: Subject to any disclaimer, the term of this patent is extended or adjusted under 35 U.S.C. 154(b) by 1083 days.

(21) Appl. No.: 14/281,687

(22) Filed: May 19, 2014

(65) Prior Publication Data

US 2014/0346778 A1 Nov. 27, 2014

(30) Foreign Application Priority Data

May 22, 2013 (ES) .................................. 201330741

(51) Int. Cl.
*H02K 3/24* (2006.01)
*H02K 1/20* (2006.01)
*H02K 9/19* (2006.01)
*H02K 9/197* (2006.01)
*F03D 80/60* (2016.01)
*H02K 9/22* (2006.01)
(Continued)

(52) U.S. Cl.
CPC ............... *H02K 9/197* (2013.01); *F03D 9/25* (2016.05); *F03D 80/60* (2016.05); *H02K 1/20* (2013.01); *H02K 3/24* (2013.01); *H02K 9/19* (2013.01); *H02K 9/22* (2013.01); *H02K 7/1838* (2013.01)

(58) Field of Classification Search
CPC .. H02K 1/20; H02K 3/24; H02K 9/19; H02K 9/22
USPC .................................. 310/52, 54, 58, 59, 64
See application file for complete search history.

(56) References Cited

U.S. PATENT DOCUMENTS 3,106,654 A * 10/1963 Wesolowski ........... H02K 9/005
310/183
4,864,172 A * 9/1989 Dodt .................... H02K 49/043
310/105
(Continued)

FOREIGN PATENT DOCUMENTS

EP 2124322 11/2009
JP 2009240113 A * 10/2009

OTHER PUBLICATIONS

Machine Translation, Fukushima, JP 2009240113 A, Oct. 15, 2009.*

*Primary Examiner* — Thomas Truong
(74) *Attorney, Agent, or Firm* — Womble Bond Dickinson (US) LLP

(57) ABSTRACT

It allows a more complete cooling of the generator, comprising: a magnetic core with a crown (3) from the periphery whereof emerge teeth (4) which have coiled windings (5); an external cooling circuit (9) to carry a coolant fluid; at least one through-hole (12) running along the interior of each tooth (4), and at least one first duct (13), to connect the through-hole (12) with the external cooling circuit (9) and with the through-hole (12) so that it allows the passage of the coolant fluid, the first duct (13, 16) being interposed between one end (7, 8) of the tooth (4) and the winding (5).

15 Claims, 5 Drawing Sheets

(51) Int. Cl.
*F03D 9/25* (2016.01)
*H02K 7/18* (2006.01)

(56) References Cited

U.S. PATENT DOCUMENTS

| | | | |
|---|---|---|---|
| 2006/0145548 A1* | 7/2006 | Wakita | H02K 3/24 |
| | | | 310/54 |
| 2007/0024132 A1 | 2/2007 | Salamah et al. | |
| 2009/0302702 A1* | 12/2009 | Pabst | H02K 1/2773 |
| | | | 310/156.12 |
| 2010/0218918 A1* | 9/2010 | Sonohara | B60K 6/26 |
| | | | 165/104.31 |
| 2012/0091837 A1 | 4/2012 | Bodenstein et al. | |
| 2012/0161556 A1* | 6/2012 | Mizutani | H02K 1/20 |
| | | | 310/64 |

\* cited by examiner

DIBUJOS

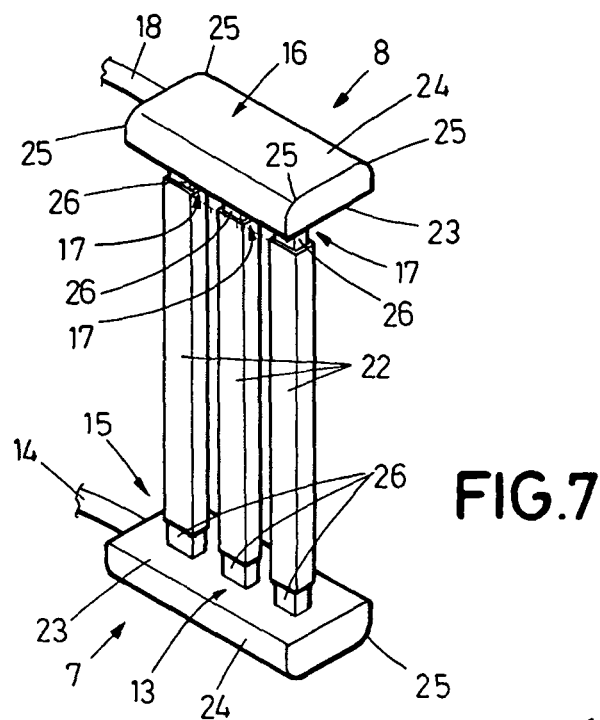
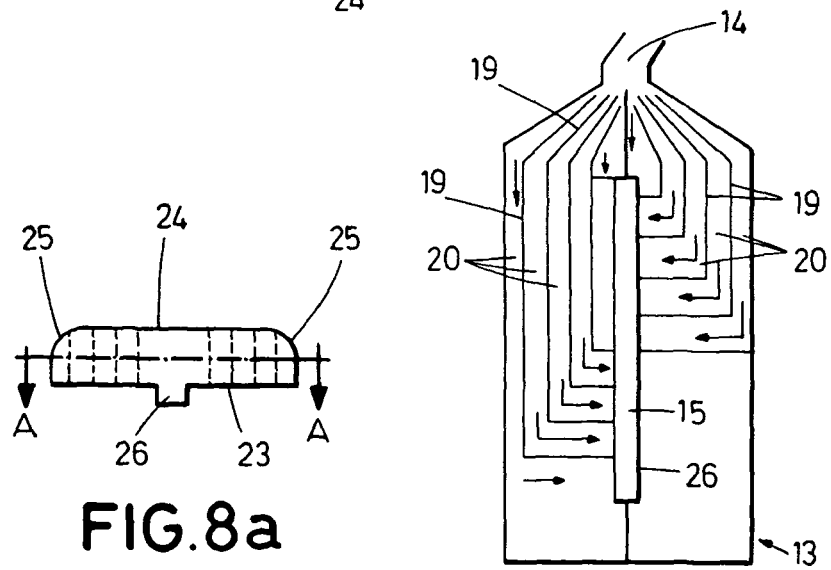

B-B

ROTARY ELECTRIC GENERATOR STATOR, ROTARY ELECTRIC GENERATOR COMPRISING SAID STATOR AND WIND TURBINE INCORPORATING SAID ROTARY ELECTRIC GENERATOR

OBJECT OF THE INVENTION

The present invention can be included in the technical field of rotary electric generators, in particular in the cooling of said rotary electric generators.

In particular, the invention relates, in accordance with a first object, to a stator of a rotary electric generator, the stator incorporating cooling means of increased efficiency. In accordance with a second object, the invention relates to a rotary electric generator comprising said stator. In accordance with a third object, the invention relates to a wind turbine incorporating the rotary electric generator referred to above.

BACKGROUND OF THE INVENTION

Nowadays the use of renewable energies is common for electricity generation, being wind power one of the most efficient among them. The use of wind power makes it possible to obtain electricity from the wind using wind turbines, which basically comprise a tower, a nacelle which houses a rotary electric generator and a rotor formed in turn by at least two blades.

In wind turbines of those known as multi-Megawatt, there is a market trend towards power conversion systems without the use of multiplier, which means that the rotation speed is low and, therefore, the torque developed is, on the other hand, very high.

The dimensions of a wind turbine—diameter and height of the tower—depend on the torque developed, being interesting in general to increase the diameter in relation to the height to optimize the weight and the cost of the active parts, i.e. the copper, the magnetic material and, where applicable, the permanent magnets. Another factor that affects the dimensioning of the wind turbine is heating. The temperature affects the degradation of the wind turbine insulation and, in the case of wind turbines with permanent magnets; it may cause the loss of magnetization.

There are various alternatives for the cooling of the rotary electric generators used in the wind turbines.

Heat dissipating fins. The electrical machine casings often have fins which favour the dissipation of the heat generated therein. Said fins favour the cooling of the generator exterior by convection.

Air forced cooling. It uses fans to force air circulation through the air gap, favouring cooling by convection. Cooling levels achieved are greater than with the simple use of fins.

Liquid cooling. It is common that a fluid cooling circuit is installed, inside the stator crown. These solutions also incorporate external radiators for the dissipation of heat evacuated by the circuit, wherein the radiators may also be cooled by ventilation.

United States application US2012/0091837 shows an illustrative example of a large number of solutions that propose a liquid cooling system applied to an electric generator of a wind turbine, where the generator comprises a stator equipped with a liquid cooling system, by a plurality of tubes (or holes) in longitudinal direction disposed in the periphery of the stator, wherethrough a coolant fluid can flow, forming a meandering closed circuit.

Furthermore, the United States application US2007/0024132 has the object of a wind turbine generator, comprising a stator equipped with a magnetic core which crown is disposed circumferentially around a longitudinal axis and the teeth of which extend radially from the crown. A plurality of coils is disposed on the teeth. Said generator, has a cooling circuit in connection with a plurality of ducts configured to transport a coolant fluid which, in an embodiment, traverse the magnetic crown of the stator. In an alternative embodiment, a space is disposed between adjacent coils wherein a cooling duct is located.

This cooling system has a series of disadvantages. The first one is that it does not provide enough cooling to the ends of the coils, which on occasions may be of large dimensions and which considerably increase the generator dimensions, as they require a free space between the coils designed to house the cooling ducts that reduce the free space for the copper in the conductors.

Additionally, European application EP2124322 relates to a system for generating power comprising a superconducting generator which in turn includes an armature assembly equipped with a body portion, a tooth portion (having a front surface and a rear surface), a slot partially defined by the body portion and the tooth portion, an armature bar engaging the slot, and a cooling cavity partially defined by the tooth portion, communicative with the front surface and the rear surface, traversing the tooth portion and configured to carry cooled air or house coolant fluid ducts.

Said invention provides a better use of the space than the previous one but without providing a suitable solution to the problem of cooling the coil ends. The need has been detected for describing a cooled rotary electric generator so that it resolves said problems of the state of the art.

DESCRIPTION OF THE INVENTION

The present invention resolves the technical problem posed, by, in accordance with a first object, a stator of a rotary electric generator, which provides a more efficient cooling of all its components and, more specifically, by a more direct cooling of the coil ends, as shall be explained below. In accordance with a second object of the invention, a rotary electric generator is described comprising the stator mentioned. In accordance with a third object, a wind turbine is described comprising the aforementioned rotary electric generator.

The stator of the rotary electric generator in accordance with the first object of the invention comprises a magnetic core endowed with a crown which in turn is endowed with a plurality of teeth which protrude from the periphery of said crown, where a winding is wound around the teeth, as known in the state of the art.

The stator additionally comprises an external cooling circuit designed to carry a coolant fluid.

In the interior of at least one of the teeth, preferably of all the teeth, there is at least one through-hole, which completely runs through it longitudinally, i.e. between the two ends that delimit its length.

The invention is characterized in that it further incorporates at least one first duct, to connect the external cooling circuit with the at least one through-hole in each one of their ends. Preferably, the first duct is configured to allow the passage of the coolant fluid from the external cooling circuit to the through-hole, both an inlet at one of its ends and an outlet at the opposite end.

Using the configuration described, the coolant fluid is allowed, in addition to cooling the periphery of the crown during its run along the exterior of the crown, to also extract the heat generated by the losses in a more direct way (both those that take place in the windings and those originated in the magnetic core) by the passage of coolant fluid consecutively through the interior of each one of the teeth.

Furthermore, the first duct is interposed between one end of said tooth and the winding. The winding forms coils which are positioned surrounding the first ducts, the losses generated by the passage of electrical current in the coils are extracted better, leading to a better and more homogeneous cooling of the generator, which enables increasing the efficiency of the generator and its life. Otherwise, hot spots might exist in the generator which are source of failures.

To achieve the abovementioned advantages, the first duct is made of a material with a high thermal conductivity, e.g. metal.

In addition to a more intense cooling of the stator, it is also provided an improvement in the cooling of other components of the generator close to the stator, such as, for example, the generator rotor, since a lower temperature of the tooth produces a lower temperature in the air gap, which subsequently implies a lower temperature in the generator rotor. In the event that the generator rotor comprises permanent magnets, a better cooling of said generator reduces the risk of demagnetization, since it avoids reaching the so-called Curie temperature in the permanent magnets.

DESCRIPTION OF THE DRAWINGS

To complement the description which is being made and in order to help to a better understanding of the characteristics of the invention, in accordance with a preferred example of practical embodiment thereof, a set of drawings is attached as an integral part of said description wherein, with illustrative and non-limiting character, the following has been represented:

FIG. 7.—Shows a detail of the first ducts and the second duct in the embodiment represented in FIG. 6.

FIG. 8.—Shows respective details in a sectional plan and an elevation view of a first duct where slats and channels are observed for the case of the embodiment with a single through-hole.

PREFERRED EMBODIMENT OF THE INVENTION

Below, with the aid of FIGS. 1 to 9 described above, a description in detail of a preferred embodiment of the invention is provided.

Figure 1:
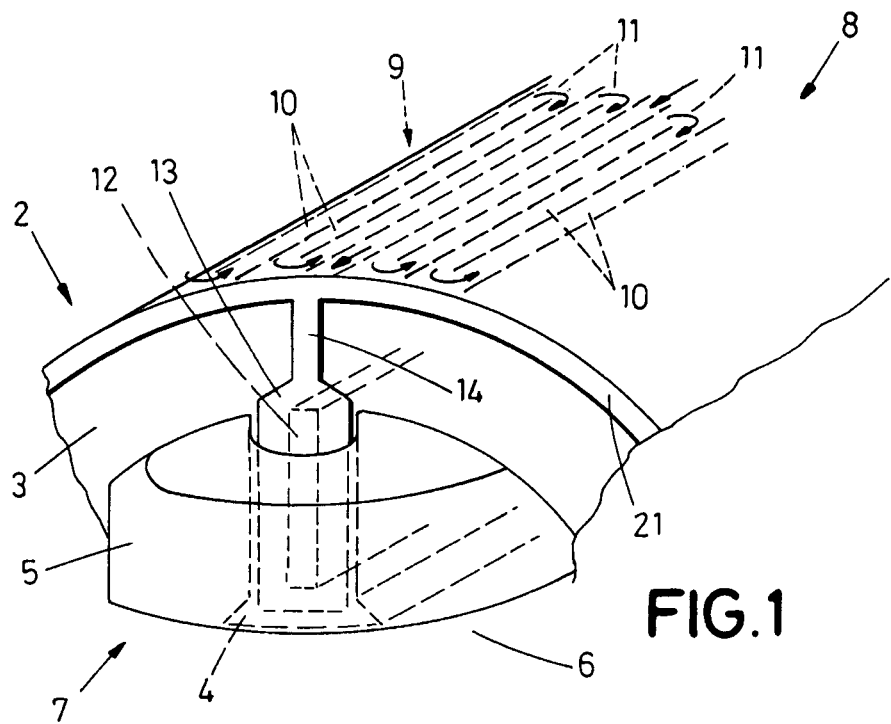
FIG. 1.—Shows a perspective view of a stator in accordance with the first object of the invention.

As observed in FIG. 1, the rotary electric generator in accordance with the present invention comprises a generator rotor (not shown) and a stator (2). The stator (2) may be internal to the generator rotor or alternatively may be external to the generator rotor. The figures show a stator (2) external to the generator rotor.

The stator (2) generally has a cylindrical shape, defined around a central axis of revolution. The direction of the central axis is defined as the longitudinal direction and those perpendicular to the longitudinal direction are defined as radial directions.

The stator (2) comprises a magnetic core comprising in turn a crown (3) and a plurality of teeth (4) which extend radially from the crown (3). On the teeth (4) a winding (5) is wound, which in the embodiment represented in the figures has the form of coils. The stator (2) may be produced in any of the ways known in the state of the art, for example, by iron plates equipped with an insulating coating.

Tooth height is defined as the dimension of the tooth (4) in the radial direction; tooth length, as the dimension of the tooth (4) in the longitudinal direction; and tooth width, which is the dimension of the tooth (4) in direction perpendicular to the plane defined by the radial direction and the longitudinal direction.

As shown in FIG. 1, the stator (2) further incorporates an external cooling circuit (9) designed to carry a coolant fluid over the outside of the crown (3), where preferably the external cooling circuit (9) has a winding configuration, i.e. in the form of coil, to allow the circulation of the coolant fluid alternatively in one direction and in other along the stator (2) and thus reduce the number of fluid inlets in the outer cooling circuit (9) from, for example, a coolant fluid feed pump which drives it from a heat exchanger situated externally to the generator, wherein the coolant fluid gives off the heat extracted from the stator (2) to another coolant fluid, for example, air.

The cooling circuit (9) has a winding configuration and is defined by run sections (10), through the interior of which the coolant fluid runs over the exterior of the periphery alternatively between the first end (7) and the second end (8); and turning sections (11), where the coolant fluid changes its run direction. In the figures, run sections (10) are represented oriented according to the longitudinal direction, however, run sections (10) oriented in oblique directions with respect to the longitudinal direction are also possible. FIG. 1 shows, by way of an example, a cooling circuit (9) which is defined inside a cylindrical body (21) which surrounds the outer part of the magnetic core.

Additionally, each one of the teeth (4) comprises at least one through-hole (12) which completely runs through the tooth (4) in longitudinal direction, i.e. between the two ends (7, 8) which delimit their length.

Each through-hole (12) is connected to the external cooling circuit (9), to allow both the inlet of coolant fluid in the tooth (4) from the external cooling circuit (9), and the return of the coolant fluid from the tooth (4) towards the external cooling circuit (9).

By the described configuration, the coolant fluid is allowed, in addition to extracting heat through the outer surface of the crown (3) of the stator (2), to also extract heat through the surface of the teeth (4) on channelling at least part of the coolant fluid towards the interior of the teeth (4) through said through-holes (12). Since the through-hole (12) runs through the tooth (4) throughout the length thereof, a more direct cooling occurs of the coils, increasing cooling efficiency in the generator.

Preferably, the through-hole (12) is centred with respect to the width of the tooth (4). Even more preferably, the through-hole (12) covers the largest possible part of the height of the tooth (4), for example, at least 60% of the height, more preferably at least 80% of the height. Likewise, preferably, the width of the through-holes (12) is substantially less than the width of the teeth (4). This enables that the magnetic core does not have its reluctance increased to a great extent as a consequence of having the through-holes (12) in the teeth (4), therefore reducing the section of core available for the magnetic flow through the teeth (4).

Figure 4:
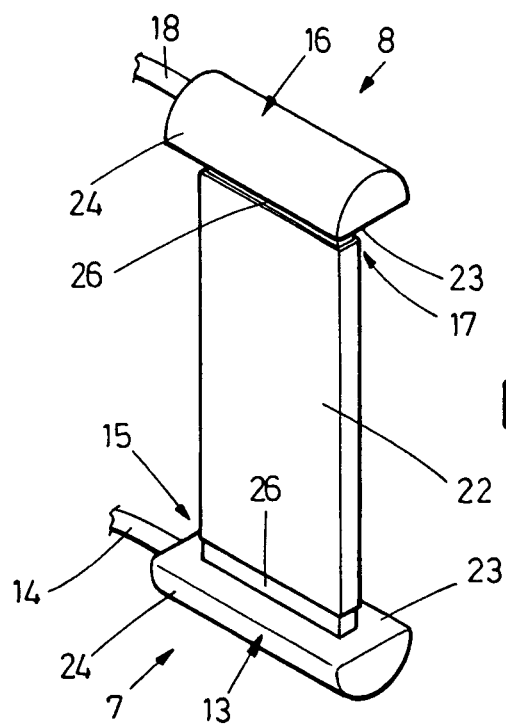
FIG. 4.—Shows a detail of the first ducts and the second duct in the embodiment represented in FIG. 2.
Figure 5:
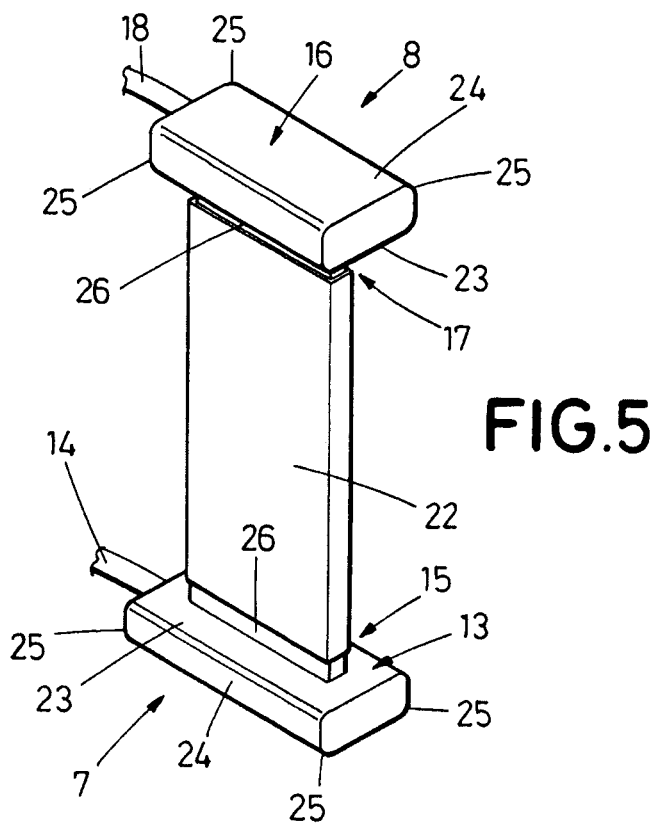
FIG. 5.—Shows a detail of the first ducts and the second duct in the embodiment represented in FIG. 3.

According to what is shown in FIGS. 4, 5 and 7, the stator (2) further incorporates first ducts (13, 16) to connect the external cooling circuit (9) to the through-hole (12). Depending on the direction of flow of the coolant fluid along the external cooling duct (9), the first ducts (13, 16) may be first inlet ducts (13) or first outlet ducts (16), as shall be explained below, although in general their function is equivalent, i.e. the channelling of the flow towards or from the interior of the through-hole.

In particular, each first inlet duct (13) shall be positioned in connection with the external cooling circuit (9) and with the through-hole (12), by means of a first inlet (14), to allow access of the coolant fluid from the external cooling circuit (9) to the first inlet duct (13), as well as at least one first outlet (15), to allow access of the coolant fluid from the first inlet duct (13) to the through-hole (12). Furthermore, the first duct (13, 16) is interposed between one end (7, 8) of the tooth (4) and the winding (5) and positioned in thermal contact by conduction with the winding (5) and preferably also with the tooth (4), so that the heat generated by the conduction losses in said winding (5), in particular, at the end of the coils that form said winding (5), are extracted by conduction by means of the coolant fluid which is carried through said first duct (13, 16).

The term thermal contact by conduction makes reference to the windings (5) and the first ducts (13, 16) and, preferably, the teeth (4) and the first ducts (13, 16), are positioned either in direct contact or through an element with high thermal conductivity. Thus, it is possible to dispose, interposed between the teeth (4) and the first ducts, a compacting plate (not shown) of the iron plates that form the magnetic core, this plate being preferably made of a material with high thermal conductivity, for example, a metal plate.

In an embodiment, the channelling of the coolant fluid from the external cooling circuit (9) is performed totally in each one of the teeth (4). For this purpose, the end of the longitudinal run section (10) close to the end (7, 8) of a tooth (4), has an outlet towards the first duct (13) and does not have a turning section (11) in said end.

Similarly, each first outlet duct (16) has a second inlet (17) to allow the access of the coolant fluid from the through-hole (12) towards said first outlet ducts (16), as well as a second outlet (18), to allow the access of the coolant fluid from the first outlet ducts (16) towards the external cooling circuit (9). The first outlet ducts (16) are attached to a second end (8) of the teeth (4), and likewise surrounded by the winding (5).

Preferably, the first inlet ducts (13) and/or the first outlet ducts (16) have a flat and slender configuration, and cover the greatest possible surface area of respectively the first end (7) and the second end (8) of the tooth (4), for example, at least 60%, preferably, at least 80%.

The disposal of first inlet ducts (13) and first outlet ducts (16) between the ends of the teeth (4) and the windings (5) allows that the coolant fluid can also act on the final parts of the windings (5), understanding this as the ends of windings (5) which are around the ends of the teeth (4), improving cooling. The flat configurations which have been selected as preferable for the first inlet ducts (13) and the first outlet ducts (16), make it possible to obtain a high contact surface with the ends of the windings (5) without significantly increasing the length of the winding (5).

According to a preferred embodiment of the invention, the coolant fluid may run through the through-holes (12) in direct contact with the interior of the teeth (4). However, as shown in FIGS. 4, 5 and 7, according to an alternative embodiment, it is preferred the incorporation of second ducts (22), housed in the interior of the through-holes (12) and connected to the external cooling circuit (9) in the first end (7) and in the second end (8) of each tooth (4), through the first inlet ducts (13) and/or the first outlet ducts (16). In this way, although the heat exchange between the teeth (4) and the coolant fluid is not so intense, it is allowed the use of coolant fluids which, being harmful for the core, could not be used in accordance with the alternative embodiment explained above.

In said FIGS. 4, 5 and 7 it is observed that the second ducts (22) have a cross section slightly greater than joining bodies (26) located in the first inlet ducts (13) and in the first outlet ducts (16) to be connected to the second ducts (22). The joining of said second ducts (22) to the joining bodies (26) is watertight to avoid leaks of coolant fluid towards the electric parts of the generator.

Figure 6:
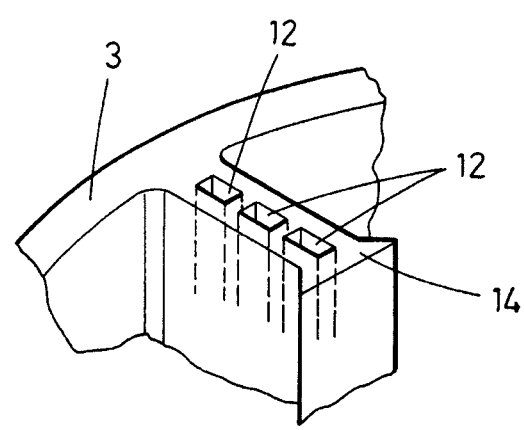
FIG. 6.—Shows an embodiment wherein the teeth have three through-holes.

In accordance with another preferred embodiment, there is a plurality of through-holes (12), as shown in FIG. 6, for at least one of the teeth (4), preferably for each tooth (4). Even more preferably, each through-hole (12) could be associated to its corresponding second duct (22), as observed in figure 7.

Likewise, in accordance with a preferred embodiment of the invention, the geometry of at least one of the first inlet ducts (13) and/or at least one of the first outlet ducts (16), preferably of all the first inlet ducts (13) and of all the first outlet ducts (16), is configured to offer a large contact surface with the winding (5) of the teeth (4).

Figure 2:
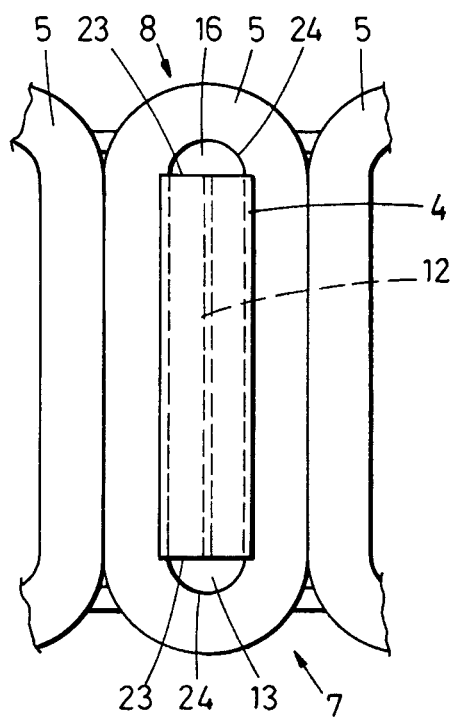
FIG. 2.—Shows a bottom view of the tooth and the winding in accordance with an embodiment of the invention wherein the first ducts have semicircular form.
Figure 3:
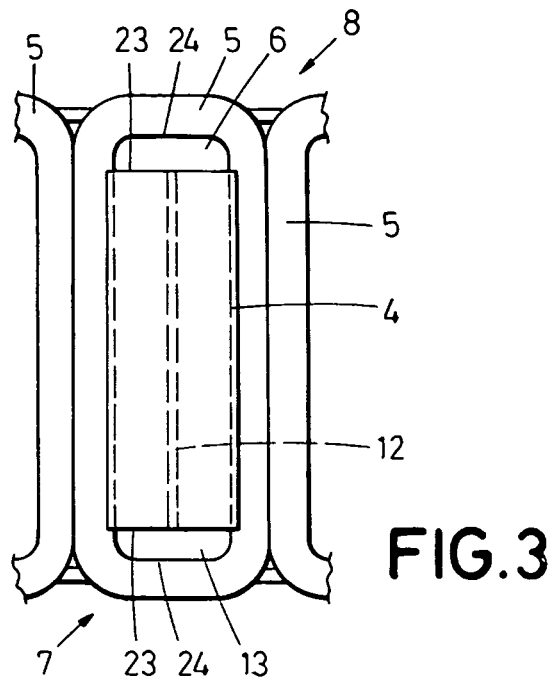
FIG. 3.—Shows a bottom view of a detail of the tooth and the winding in accordance with an embodiment of the invention wherein the first ducts have rectangular form with rounded vertices.

Thus, by way of examples represented in FIGS. 2 to 5, the first inlet duct (13) and/or the first outlet duct (16) have a first flat face (23), respectively in contact with the first end (7) or the second end (8) of the tooth (4), as well as they feature a second curved face (24) which, in accordance with the example shown in FIGS. 2 and 4, has semicircular form, whilst in accordance with the example shown in FIGS. 3 and 5, it has rectangular form comprising vertices (25) opposite the first face (23), which are rounded. Said geometry is in any case chosen depending on the form adopted by the winding (5) at the ends of the coils, with a view to maximizing the contact surface between the first ducts (13, 16) and second ducts (22) and the winding (5) and maximize the cooling in said area.

Figure 9A:
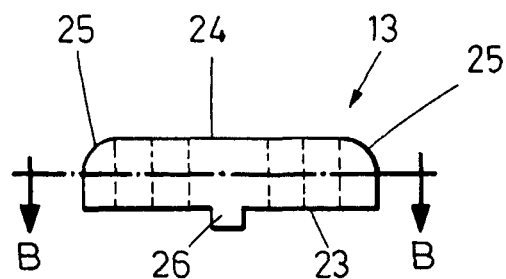
FIG. 9.—Shows respective details in a sectional plan and an elevation view of a first duct where slats and channels are observed for the case of the embodiment with four through-holes.
Figure 9B:
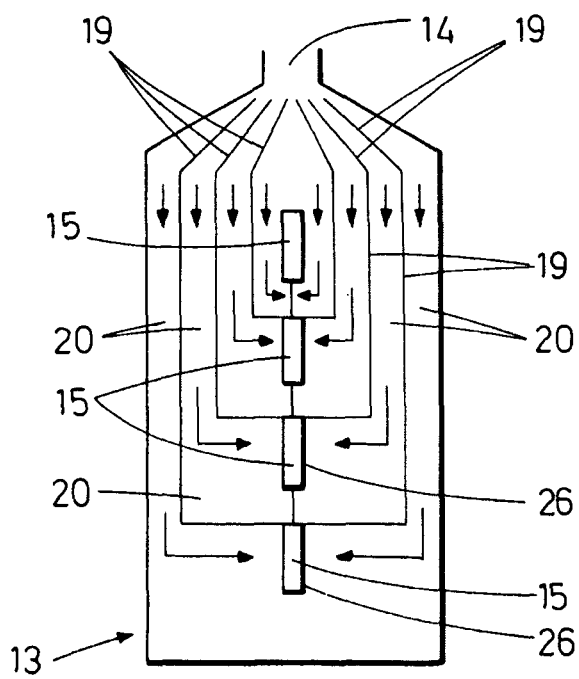

In accordance with a preferred embodiment of the invention, as observed in FIGS. 8 and 9, the first inlet duct (13) and/or the first outlet duct (16), preferably only the first inlet duct (13), comprise therein a plurality of slats (19) which define channels (20) to divert the flow of coolant fluid. The channels (20) flow into the through-hole (12) through the first outlets (15) or, where applicable, the second outlets (18), which are located at different heights. As a consequence of the configuration described, a more homogeneous circulation of coolant fluid occurs in the first inlet duct (13) and/or in the first outlet duct (16) and, therefore, a more homogeneous and effective cooling and less possibility of finding hot points.

Thus, a distribution of slats (19) is observed in FIG. 8 in accordance with a tooth (4) wherein there is only one through-hole (12), whilst in FIG. 9 the case of several through-holes (12) is observed. In this last case, it is preferred that the width of the cross section of the channels (20) defined by the slats (19), as well as the cross section of the first inlets (14), is in proportionality with the dimensions of the through-holes (12) in which they flow into, to obtain a distribution of coolant fluid flow as uniform as possible. For example, channels (20) with identical cross sections correspond to through-holes (12) with identical cross sections, and identical cross sections in the first inlets (14) correspond to overall identical cross sections of through-holes (12) in different teeth (4).

More preferably, for a greater efficiency in the cooling system, the materials used for manufacturing of the first (13, 16) and second ducts (22), as well as the external cooling circuit, have a high thermal conductivity.

Additionally, this invention can be complemented with a ventilation system comprising fans (not shown) situated in at least one end (7, 8) of the generator, affecting the air gap (6).

The stator (2) described and the rotary electric generator comprising said stator (2) can be used in a multitude of applications, preferably in wind turbines. More specifically, a wind turbine is equipped with a tower (not represented), a nacelle (not represented) mounted on the tower, and a wind rotor (not represented), housed in the nacelle and equipped with at least two blades (not represented) and with a rotor shaft (not represented) rotatively coupled to the blades. The wind turbine further comprises the rotary electric generator described above, where the wind rotor shaft is rotatively coupled to the rotor of the rotary electric generator.

The invention claimed is:

1. A stator of a rotary electric generator, the stator comprising:
   a magnetic core endowed with a magnetic crown which, in turn, is endowed with at least one tooth having a first end and a second end opposite the first end;
   a winding wound around the at least one tooth;
   an external cooling circuit configured so as to carry a coolant fluid to refrigerate the stator;
   at least one through-hole located in the at least one tooth, which longitudinally runs through the tooth between the ends of the tooth; and
   first ducts situated in connection with the external cooling circuit and with the through-hole so as to allow the passage of the coolant fluid, the first ducts being interposed between the first end of the tooth and the winding for channeling the coolant fluid towards or from an interior of the through-hole;
   wherein the first ducts comprise:
   first inlet ducts configured so as to allow inlet of coolant fluid from the external cooling circuit towards the at least one through-hole, and
   first outlet ducts configured so as to allow outlet of the coolant fluid from the at least one through-hole towards the cooling circuit;
   wherein at least one of the first inlet ducts comprises therein a plurality of channels to divert the flow of coolant fluid from first inlets, located in said first inlet ducts, wherefrom the coolant fluid accesses to the first inlet ducts from the external cooling duct, where the channels flow into the at least one through-hole through first outlets distributed throughout the at least one through-hole, and wherein the at least one of the first outlet ducts comprises therein a plurality of channels to divert the flow of coolant fluid, where the channels flow into the at least one through-hole through second outlets distributed throughout the at least one through-hole.

2. The stator of claim 1, wherein the first ducts are disposed in thermal contact by conduction with the winding.

3. The stator of claim 2, wherein the first ducts are configured so as to maximize a surface in thermal contact by conduction with the winding.

4. The stator of claim 1, wherein the first ducts are additionally disposed in thermal contact by conduction with the tooth.

5. The stator of claim 1, wherein the first ducts comprise:
   a flat first face in thermal contact by conduction with the first end of the tooth; and
   a curved second face, opposite the first face, so as to adapt to a geometry of the winding.

6. The stator of claim 1, further incorporating a second duct inserted in the at least one through-hole and connected to the external cooling circuit in the first end and second end of the tooth and configured so as to house a circulation of the coolant fluid through the interior of the teeth in a watertight manner.

7. The stator of claim 6, further comprising joining bodies in the first ducts to connect said first ducts to the second ducts.

8. The stator of claim 1, wherein the channels and the first inlets have cross sections which are proportional to cross sections of the through-holes in which they flow into.

9. The stator of claim 1, wherein the first ducts cover at least 60% of a surface of the first end of the tooth.

10. The stator of claim 1, wherein the at least one through-hole is centred with respect to a width of the tooth.

11. The stator of claim 1, wherein the at least one through-hole covers at least 60% of a height of the tooth.

12. The stator of claim 1, wherein a width of the at least one through-hole is substantially less than a width of the tooth.

13. The stator of claim 1, wherein the external cooling circuit defines a winding circuit comprising
   run sections, inside which the coolant fluid runs along an exterior of a periphery alternatively between the first end and the second end of the tooth; and
   turning sections, where the coolant fluid changes its run direction.

14. A rotary electric generator comprising a generator rotor, further comprising the stator described in claim 1.

15. A wind turbine, comprising the rotary electric generator of claim 14.

* * * * *

UNITED STATES PATENT AND TRADEMARK OFFICE
CERTIFICATE OF CORRECTION

PATENT NO. : 10,148,154 B2
APPLICATION NO. : 14/281687
DATED : December 4, 2018
INVENTOR(S) : Arlaban Gabeiras et al.

Page 1 of 1

It is certified that error appears in the above-identified patent and that said Letters Patent is hereby corrected as shown below:

On the Title Page

In item [73], under Assignee Name and Address, at Line 1-2, delete "Sevilla (Spain)", and insert -- Navarra (Spain) --.

Signed and Sealed this
Twenty-seventh Day of August, 2019

Andrei Iancu
*Director of the United States Patent and Trademark Office*